United States Patent Office 3,107,296
Patented Oct. 15, 1963

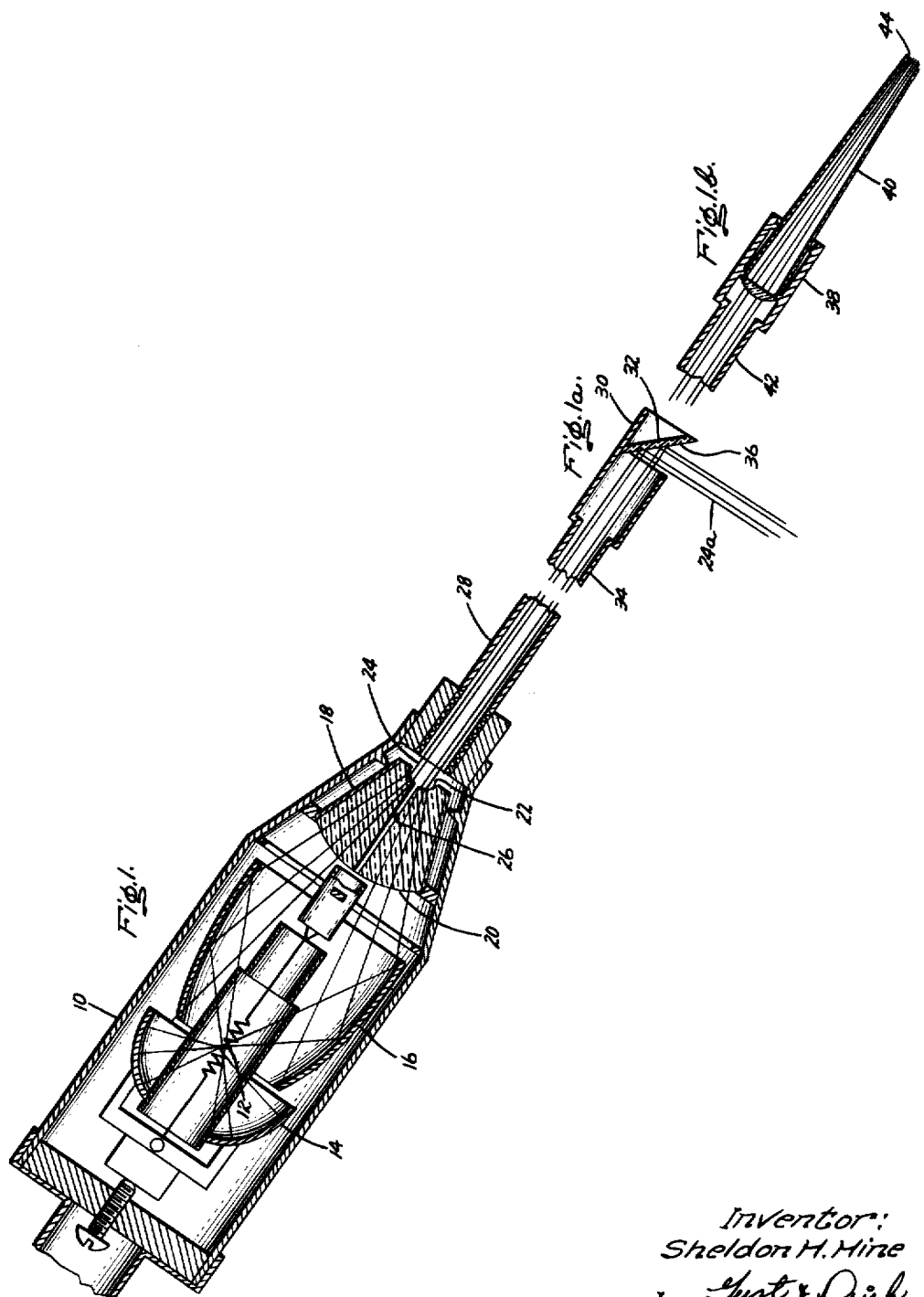

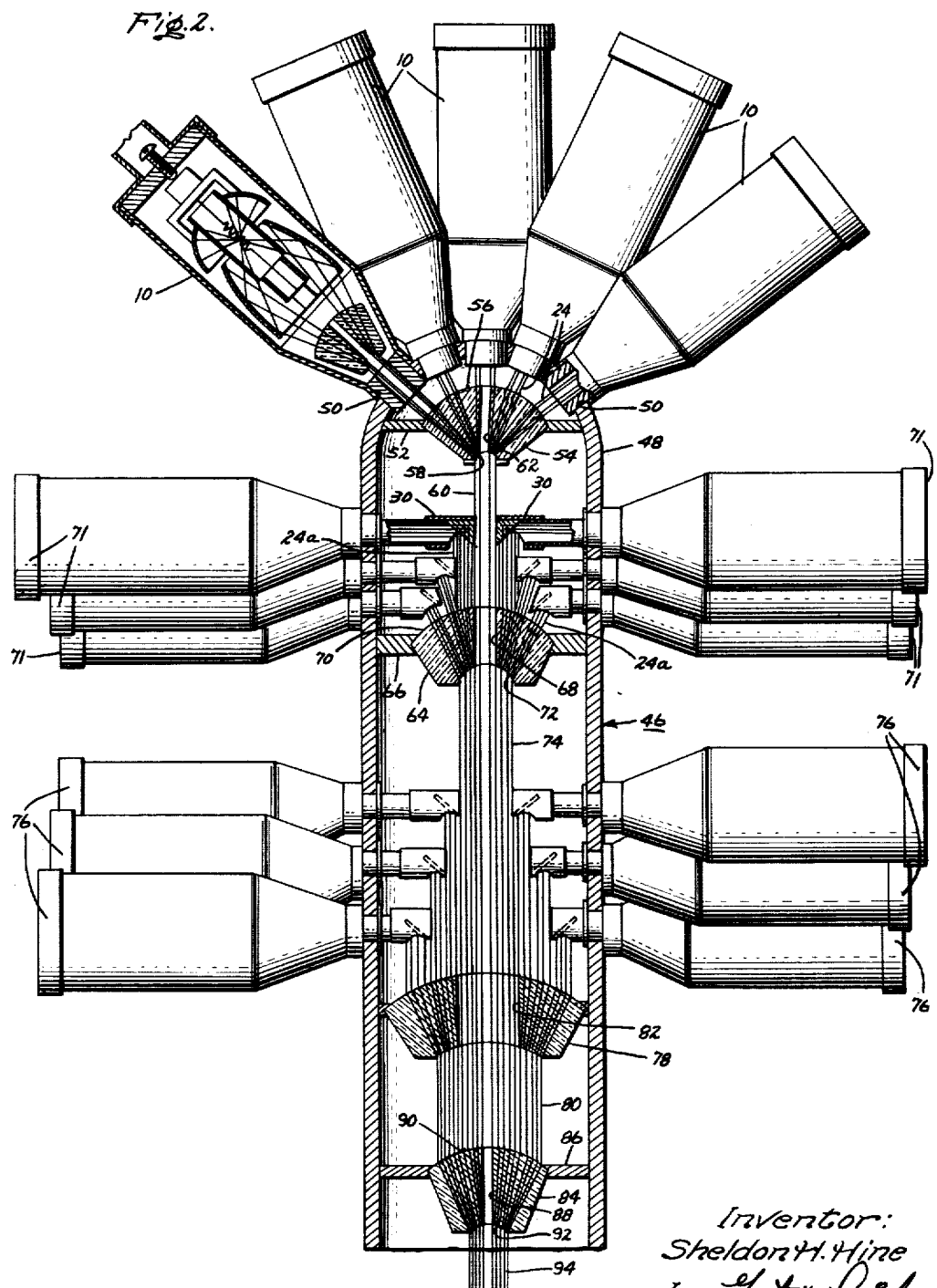

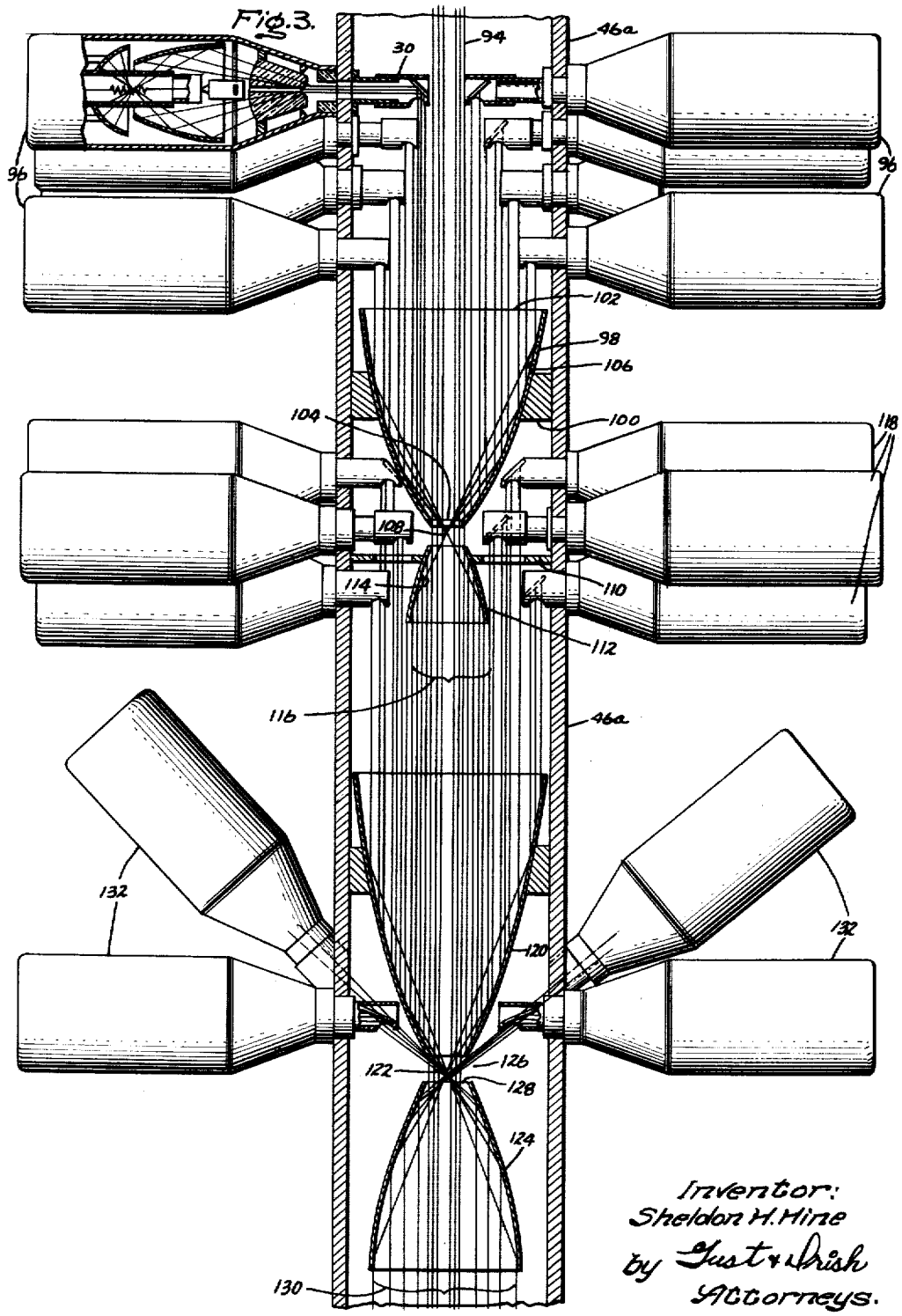

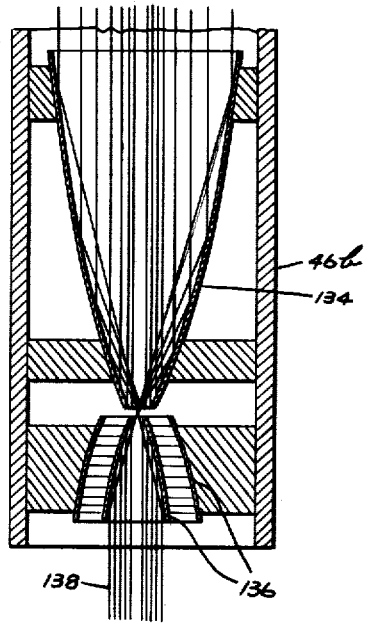
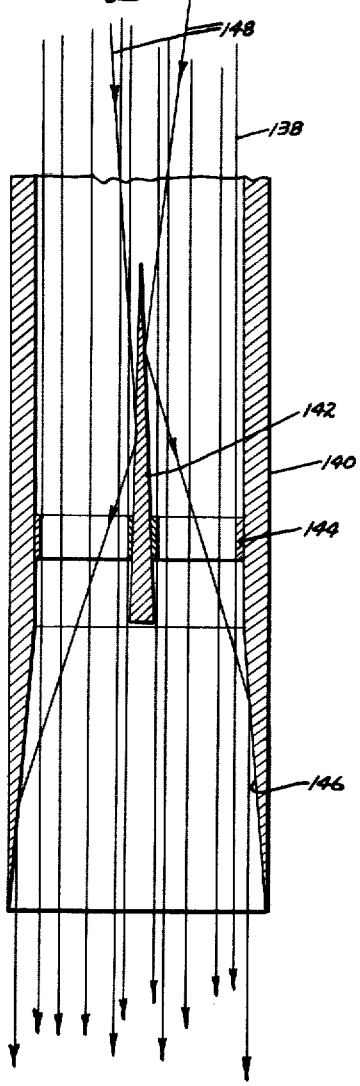

3,107,296
POWER OPTICAL APPARATUS
Sheldon H. Hine, 3232 Clinton Court, Fort Wayne, Ind.
Filed Aug. 1, 1961, Ser. No. 128,454
18 Claims. (Cl. 250—42)

The present invention relates to power optical apparatus, and more particularly to apparatus for producing and controlling a radiant energy beam of exceedingly high intensity.

In the development of a beam of radiant energy of high enough intensity for performing useful work such as heating, welding, cutting metals, long-range illumination and the like, it is necessary in the first instance to provide an initial source of the required power and thereafter fashion radiation therefrom into a usable beam. This has suggested the use of initial radiant energy sources of large size, capable of delivering the necessary power to accomplish the desired end result; however, this has not proven feasible because in the first instance practical sources of sufficiently high power cannot be produced and, secondly, adequate control of the radiation cannot be achieved.

With respect to control, the available tools are refractive and reflective means, and in the use of these with high power sources it has been found that the optical control and power losses are so great as to preclude the fashioning of an adequately powerful beam.

In the provision of a power beam according to the principles of the present invention, instead of using a high power source initially, a multiplicity of low power sources combined in a unique arrangement with either or both refractive and reflective control means are used whereby the low power radiation is collected and fashioned into a multiplicity of beams which are collimated and tightly compacted into a small bundle of beams, the bundle carrying the total power of all the sources. Further than this, this invention provides unique means of adding additional beams to the small bundle in a cascading arrangement and then compressing and compacting all of the beams into a composite bundle of minimal cross-section area of extremely high intensity.

It is therefore an object to provide apparatus for collecting and collimating radiant energy into a beam of minimal diameter.

It is another object of this invention to add a plurality of beams of radiant energy in such a manner as to provide a unitary bundle of beams of high intensity.

It is still another object of this invention to provide apparatus which may be cascaded for adding a multiplicity of beams together to obtain a unitary bundle of collimated beams wherein the bundle is of minimum diameter and has a minimum of divergence.

It is yet another object of this invention to provide apparatus capable of producing a radiant energy beam of extremely high intensity for performing useful work.

It is a further object to provide apparatus for compacting and compressing radiant energy into the smallest possible beam or beams.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a longitudinal sectional illustration of a unit projector used in the apparatus of this invention;

FIG. 1a is a mirror tip unit adapted to be used in conjunction with the projector of FIG. 1;

FIG. 1b is another tip structure which may be used in conjunction with the projector of FIG. 1;

FIG. 2 is a longitudinal sectional illustration of a cascading system constituting one embodiment of this invention wherein a plurality of low power beams are compressed and compacted into a beam of minimal cross-section with a resultant increase of intensity;

FIG. 3 is a longitudinal sectional illustration of a second cascading system incorporating reflective optics for compressing and compacting a plurality of low power beams into a single bundle of beams of high intensity;

FIG. 4 is a longitudinal sectional illustration of reflective optics used in cascade with the preceding systems for compressing a given bundle of beams into a smaller bundle; and FIG. 5 is a longitudinal sectional illustration of a reflective device for orienting spurious radiation in a given beam into parallelism with a main beam.

Referring to the drawings, and more particularly to FIG. 1, a unit projector capable of producing a collimated beam of light is shown as comprising an elongated housing 10 having a projection lamp 12 fixedly mounted therein and two reflectors 14 and 16 also mounted therein in a position to receive the radiation from the lamp 12. Specifically, the reflector 14 is hemispherical in shape and encircles the rear-end portion of the lamp 12. The reflector 16 is ellipsoidal in shape and is positioned to encircle the forward end of the lamp 12 as shown. Radiation from the lamp 12 striking the reflector 14 is reflected from the latter forwardly onto the reflector 16 from which it is again reflected forwardly. Also, radiation received by the reflector 16 directly from the lamp 12 is reflected forwardly as shown.

The lamp 12 may be of any conventional type such as a quartz jacketed helogen lamp, a standard projection lamp, or any radiant source which is acceptable for optical control.

In the front end of the housing 10 is mounted a refracting element or compressing lens 18 which is transparent to the radiation of the lamp 12. This lens 18 in one form has the shape of a segment of a sphere. The segment is provided with two curved surfaces 20 and 22, respectively, the surface 20 being larger than the surface 22. Both surfaces are curved in the same direction as shown. The particular shapes of the curvatures of these two surfaces 20 and 22 are such that the incident radiation received from the reflectors 14 and 16 are refracted as shown into a collimated beam 24, this beam emerging from the curved surface 22 coaxial with the axis of the lens 18. The lens 18 collects convergent radiation and collimates the same into a unitary beam of minimal cross-section. The lens 18 may be fabricated of quartz or any other suitable material.

The specific lens 18 illustrated in FIG. 1, while being in the shape of a segment of a sphere, is also frustoconical in shape and symmetrical about its axis. In one form of the invention, the lens 18 is provided with a coaxial bore 26 which passes through the centers of both surfaces 20 and 22 respectively as shown. By the use of this bore, the beam 24 which emerges from the surface 22 is hollow or otherwise tubular in shape.

A tubular support 28 is coaxially fitted to the right-hand end of the housing 10 so as to receive coaxially therethrough the beam 24.

In FIG. 1a is illustrated a tip structure which may be attached to the right-hand end of the projector tube 28 for redirecting the beam 24. This tip comprises a small tubular housing 30 having a mirror 32 mounted therein, this housing 30 being hollow and having attached thereto a hollow coupling 34 adapted to be coaxially attached to the right-hand end of the projector tube 28. When so attached, the beam 24 passes through the coupling 34 and the housing 30 to impinge the mirror 32 from which it is reflected through an opening 36 in the housing as beam 24a.

Another tip structure which may be used in conjunction with the projector of FIG. 1 is illustrated in FIG. 1b, this structure comprising a supporting tube 38 having coaxially mounted therein a refracting cone 40 of quartz or the like which is coaxial with the tube 38. A tubular coupling 42 coaxially attached to the support 38 is adapted to be attached to the right-hand end of the projector tube 28. The beam 24 may therefore pass through the tube 24 and the cone 38 to strike the enlarged left-hand end of the cone 40 and by the latter be compressed and focused to an effective point source at the tip 44 of the cone 40. By the use of this tip structure of FIG. 1b, the relatively large energy source as provided by the lamp 12 may be conveniently and effectively reduced in size to almost a point source at the tip 44.

Referring to FIG. 2, apparatus for collecting and compressing a plurality of individual beams into a single bundle of beams of minimal cross-section will now be described. This apparatus comprises a tubular support generally indicated by the numeral 46 having a cap 48 of hemispherical shape secured to the upper end thereof. A plurality of the projectors 10 of FIG. 1 are secured to the cap 48 in a circular pattern as shown, these projectors being secured to openings 50 in the cap 48 so that the individual beams produced by the projectors may be directed into the interior of the cap 48. While the projectors 10 have been illustrated as being five in number and further as being arranged in a circular pattern, it will become apparent from the description to follow that the number may vary as well as the particular geometrical pattern of attachment to the cap 48.

Secured inside the cap 50 by means of a suitable mounting spider or disc 52 is a compressing lens 54 which is fabricated to much the same shape as the lens 18 of FIG. 1. This lens 54 is so mounted that the larger surface 56 receives the individual beams 24 from the projectors 10 and the smaller surface 58 also receives these beams as refracted and compressed and thereafter directs them into a collimated bundle of beams as indicated by the numeral 60. The lens 54 is provided with a coaxial bore 62 like the bore 26 in FIG. 1 for the purpose of rendering the beam 60 hollow and also to facilitate cooling of the lens.

The purpose of the lens 54 is to collect the various beams 24 from the projectors 10 and to compress them individually and collectively into a tightly compacted beam bundle 60 as shown. In designing an apparatus, it is desired to fashion the bundle 60 to as small a diameter as possible, since by doing so the energy carried by the bundle is increased in inverse proportion to its size.

Another compressing lens 64 is coaxially mounted inside the tubular support 46 by means of a rigid disc or spider 66. This lens 64 is provided with a coaxial bore 68 which is just large enough to coaxially receive therethrough the bundle 60 as shown.

Fastened to the wall of the support 46 is a circumferential series of projectors 71 (like the projectors of FIG. 1) having tip structures 30 thereon which are oriented to direct the beams 24a onto the curved surface 70 of the lens 64. This surface 70 as well as the smaller surface 72 are so formed as to compress the individual beams 24a from the projectors 71 inwardly into a tightly compacted bundle which contiguously surrounds the first bundle 60. The resultant bundle 74 is still hollow but is of slightly larger cross-sectional area than the original bundle 60. This composite bundle 74 contains a greater amount of energy than the original bundle 60 as represented by the energy contributions of the projectors 71.

For the purpose of demonstrating that still more power may be added to the composite bundle 74, another circumferential series of projectors 76 in combination with another compressing lens 78 are mounted on the tubular support 46 to produce a second composite bundle indicated by the numeral 80 of higher power than the previous bundle 74. The projector 76 may be identical to the projectors 10, and the lens 78 may be identical in structure to the lens 64 with the exception that the bore 82 is larger so as to receive unimpeded the bundle 74. Further, the lens 78 is so shaped as to compress and collimate tightly around the composite bundle 74 the radiation received from the projector 76.

As a final element in the array of FIG. 2, a compressing lens 84 is coaxially secured inside the tubular support 46 by means of a suitable disc or supporting spider 86. This lens 84 is constructed along the same principles as the previously described lenses and is provided with a bore 88 having a diameter substantially of the same size and in registry with the hollow center of the first bundle 60. The composite bundle 80 which is directed onto the larger surface 90 of the lens 84 is compressed and emitted from the smaller curved surface 92 as a compressed beam 94. As shown in the drawings, the bundle 94 contains the same number of individual beams as the composite beam 80 yet it is substantially smaller in diameter, whereupon the power modulus of the beam is vastly increased.

The apparatus described thus far utilizes refractive means for fabricating a high intensity bundle of beams in a plurality of cascaded steps. It will be obvious to persons skilled in the art that the cascading steps may be repeated indefinitely until the limit is reached at which the fabricated beam is so intense that the use of refractive elements such as the various compressing lenses can no longer be used. This upper limit is determined by the ability of the refracting elements to withstand the energy which is absorbed from the beam. If the beam is to be further increased in intensity, it is obvious that other means having greater heat handling capabilities will necessarily have to be provided.

This additional means is illustrated in FIGS. 3 and 4, wherein reflective optical devices are utilized for collecting individual beams and compressing and collimating these beams into bundles of small cross-sectional area. Referring first to FIG. 3, the tubular support is indicated as being extended as indicated by the reference numeral 46a. To this support 46a is secured a plurality of projectors 96 which may be the same as the projector of FIG. 1 having the tip structure of FIG. 1a. The tip structures 30 of these projectors 96 are positioned inside the support 46a and are oriented such as to direct the individual projector beams in a direction parallel to the composite beam 94. It is important, however, that these tip structures 90 not be inserted in the path of the beam 94.

Immediately beneath the tip structures 30 of the various projectors 96 is a first parabolic reflector 98, this reflector being mounted inside the support 46a by a mounting ring 100. The reflector 98 has a hollow interior and is generally tubular in shape, being symmetrical about its axis. Its opposite ends 102 and 104 are open, the end 102 being larger in size. The wall 106 of the reflector is treated to be highly reflective, such as being coated with a suitable high reflective coating such as evaporated quartz, and is curved such that the individual beams received from the various projectors 96 will be reflected onto a common, axial focal point 108 which is adjacent to the smaller end 104.

Coaxial with the parabolic reflector 98 and mounted inside the tubular support 46a by means of an apertured supporting spider 110 is another, but smaller, parabolic reflector 112. This reflector 112 is spaced from the reflector 98 and has the interior wall 114 curved so as to provide a focal point which coincides with the focal point 108 of the larger reflector 98. The curvature of this wall 114 is also such that the beams from the projectors 96 reflected by the reflector 98 through the focal point 108 will be reflected from the reflector 112 into directions parallel to the composite beam bundle 94 as shown.

Both of the reflectors 98 and 112 have the openings thereof of such size as to pass unimpeded the composite bundle 94.

It will now be seen that additional beam energy may be added to the composite bundle 94 through the use of additional projectors 96 and the parabolic reflectors 98 and 112. The beams so added will be contiguous to the outer surface of the composite bundle 94 and will result in an enlarged bundle as indicated by the numeral 116.

Additional beams may be added to the outside of the composite bundle 116 by means of the projectors 118 and another parabolic reflector 120. The arrangement of these projectors 118 and the parabolic reflector 120 may be identical to that of the previously described projectors 96 and the reflector 98 with the exception that the sizes and parameters thereof are modified slightly so as to add the beams of the projectors 118 to the composite bundle 116. The reflector 120 is shaped such as to have a focal point at 122 which coincides with the focal point for the smaller parabolic reflector 124. The smaller open ends of the two reflectors 120 and 124 face each other and are spaced slightly apart so as to accommodate the focal point 122 therebetween. Furthermore, these facing smaller ends as indicated by the numerals 126 and 128, respectively, are made of such size as to receive unimpeded the composite bundle 94 which emerges from the refraction optics or from any other source of a collimated beam. All of the beams which strike the interior wall of the reflector 120 are reflected to the common cross-over or focal point 122 as shown. In turn, these beams continue to strike the reflective surface of the reflector 124 from which they are directed precisely parallel to the composite beam or bundle 94. Thus, the beam 130 which emerges from the reflector 124 is smaller in cross-sectional area than the one which enters the reflector 120.

Next to be described is an arrangement whereby power may be added to the bundle which emerges from the reflector 120. Again referring to FIG. 3, a series of projectors 132 which may be the same as the projectors 10 are mounted on the support 46a in such a manner as to project focused beams thereof onto the focal point 122. These projectors 132 are provided with focusing lenses or reflectors whereby the beams thereof are focused precisely onto the focal point 122 and through the opening 128 of the reflector 124. Being thus directed, the beams from these projectors 132 will strike the interior wall of the reflector 124 and be directed therefrom in directions parallel with the previously fashioned beam 94. It is of course necessary that the directions of the focused beams from the projectors 132 be arranged properly with respect to the curved reflective surfaces of the reflector 124 such that true parallelism of the reflected beams will be obtained.

Examination of FIG. 3 and particularly the ray pattern as illustrated in connection with reflector 124 reveals that the beams emitted by the projectors 132 are effectively added to the exterior of the bundle 94. Thus, an arrangement is shown whereby more power may be added to a given beam by and through the use of reflective optics.

FIG. 4 illustrates a final stage in further compressing the composite beam 130 which has been formed up to this point. Here again, two parabolic reflectors 134 and 136 positioned end-to-end as shown are coaxially arranged inside the support extension 46b so as to receive the bundle 130 and reduce the size thereof to the finally emitted bundle 138. The interior surfaces of the two reflectors 134 and 136 are so curved as to reflect the individual elements of the bundle 130 into collimated paths which are compressed in diameter so as to provide the final bundle 138 which is much smaller in cross-sectional area than the bundle 130. Thus, the bundle 138 will be a composite of all of the beams of the aforedescribed projectors, tightly compacted together into an extremely dense composite beam having a high modulus of power.

It will now appear to persons skilled in the art that the reflective optics just described may be repeated and continued in cascade to any extent desired for the purpose of achieving a beam of finite intensity, the cascading stages serving the purpose of adding power by means of low power projectors or sources and thereafter compressing and collimating all of the power into a finished composite beam of minimal cross-section.

In order to achieve the finished beam, it is of course necessary that the various parts be precisely fabricated so as to maintain divergence in the beams at a minimum and collimation to a maximum. By rendering the beam hollow as described, it is possible to use axial control elements such as that shown in FIG. 5 for the purpose of scavenging spurious radiation and directing it into the beam bundle itself. This control element is shown as comprising a combination supporting and reflecting tube 140 having a slender, needle-like reflecting cone 142, preferably formed of a magnetic material, axially aligned in the center thereof. A suitable supporting spider 144 or a magnetic supporting field having maximum open space for receiving the bundle 138 or any other bundle previously described in the system provides a minimum of masking affect. The cone 142 registered with the hollow center of the beam 138 is angled such in relation to the internal diverging reflective surface 146 of the tube 140 that spurious rays as indicated by the numeral 148 striking the cone 142 will be reflected against the surface 146 and be reflected from this surface into parallelism with the main beam. Thus, it is shown that the hollow center provides means whereby spurious radiation in the bundle may be usefully redirected into parallelism with the main beam bundle.

Also, the hollow beam permits use of a reflector as previously described for focusing the beam to a point in space. This is achieved by the use of a reflector such as reflector 120 wherein the aperture 126 has a diameter slightly smaller than the hollow center of the beam 116 and the curvature of the reflector is such as to focus the reflection therefrom to a point on axis but remote from the end of the aperture 126. Using the reflector 120 as an example, the curvature of the reflective wall would be much more gradual so as to provide a smaller angle of reflectance which causes the beams to intersect at a point farther outwardly beyond the illustrated point 122. Since the beam 116 is hollow, all of the rays thereof would impinge the reflector wall and be reflected to a point thereby producing a focal point of highest resolution. The absence of beam in the center which would normally occupy the hollow space of the beam 116 diminishes the cross-sectional area to a minimum at the focal point as every portion of the beam would be reflected and directed toward the cross-over point.

From the foregoing, it will be understood that a beam of radiant power having a minimum diameter and a minimum of divergence can be fabricated sufficiently powerful to perform useful work such as heating, welding, cutting metals, long-range illumination and the like. Fundamentally, development of this beam is predicated on the collection of energy from a large number of standard or special radiation sources of relatively low power and small size.

While the invention described in the foregoing is contained in two general, cascaded parts, namely a refractive system of optics followed by a system of reflective optics, it will be understood that the precise arrangement disclosed may be reversed with the reflective optics feeding the refractive systems. Also, it is possible to use one system to the exclusion of the other.

While I have described above the principles of my invention in connection with specific apparatus, it is to be clearly understood that this description is made only by way of example and not as a limitation to the scope of my invention.

What is claimed is:

1. Apparatus for producing a high intensity radiant power beam comprising a first plurality of radiant energy beam sources, refractive means for receiving a plurality of radiant energy beams and compressing them individually and collectively into a single compressed bundle of beams, said beam sources being positioned to direct the beams thereof onto said refractive means, a first collimating reflector having an interior wall defining a cavity which is symmetrical about an axis, said cavity having opposite open ends which are concentric with said axis, the opening at one end being smaller than the opening at the other end, said wall diverging in curved lines from said smaller open end to said larger open end and having a focal point on said axis adjacent to said smaller open end, said reflector being disposed with the smaller open end facing said refractive means and said axis coinciding with the axis of said bundle of beams whereby said beam bundle passes through both open ends of said reflector, a second plurality of radiant energy sources producing focused energy, said second energy sources being disposed laterally of said beam bundle and directed into the smaller open end of said reflector with the focal point of the focused energy from each second source coinciding with the focal point of said reflector whereby a collimated beam bundle of light is emitted from the larger open end of said reflector, a second reflector having an interior wall defining a second cavity which is symmetrical about a second axis, said second cavity having opposite open ends which are concentric with said second axis, the opening at one end of said second reflector being smaller than the opening at the other end, the wall of said second reflector diverging in curved lines from the smaller open end thereof to the larger open end and having a focal point on said second axis adjacent to the last-mentioned smaller end, said second reflector being disposed with its larger open end adjacent to the larger open end of said first reflector and said second axis coincident with the extended axis of said first reflector whereby collimated energy received by said second reflector is focused to the focal point of said second reflector, and a third reflector smaller than the second reflector having an internal cavity open at opposite ends and symmetrical about a third axis, one opening of the last-mentioned cavity being smaller than the other opening thereof, the wall of said third reflector diverging in curved lines from the smaller open end thereof to the larger open end and having a focal point on said third axis adjacent to the last-mentioned smaller end, said third reflector being disposed with its focal point coincident with the focal point of said second reflector and said third axis coincident with the second axis extended, whereby said third reflector emits a collimated intense beam bundle smaller than that received by said second reflector, the openings of all of said reflectors being large enough to receive unimpeded the beam bundle of said refractive means.

2. Apparatus for producing a high intensity radiant power beam comprising a first plurality of radiant energy sources, refractive means including a refractive compressing lens having two opposed surfaces, one surface being larger than the other and having a predetermined curvature, the smaller surface having a predetermined curvature curved in the same direction as the larger surface, the curvatures of said surfaces being such that beams directed onto said larger surface and toward said smaller surface will be refracted to emerge from the smaller surface in parallelism to provide a single bundle of beams, said sources being directed onto said larger surface at respective angles to obtain said bundle of beams, a first reflector having an interior wall defining a cavity which is symmetrical about an axis, said cavity having opposite open ends which are concentric with said axis, the opening at one end being smaller than the opening at the other end, said wall diverging in curved lines from said smaller open end to said larger open end and having a focal point on said axis adjacent to said smaller open end, said reflector being disposed with the smaller open end facing said refractive means and said axis coinciding with the axis of said bundle of beams whereby said beam bundle passes through both open ends of said reflector, a second plurality of radiant energy sources producing focused beams, said second sources being disposed laterally of said beam bundle and directed into the smaller open end of said reflector with the focal point of each beam coinciding with the focal point of said reflector whereby a collimated beam of light is emitted from the larger open end of said reflector, a second reflector having an interior wall defining a second cavity which is symmetrical about a second axis, said second cavity having opposite open ends which are concentric with said second axis, the opening at one end of said second reflector being smaller than the opening at the other end, the wall of said second reflector diverging in curved lines from the smaller open end thereof to the larger open end and having a focal point on said second axis adjacent to the last-mentioned smaller end, said second reflector being disposed with its larger open end adjacent to the larger open end of said first reflector and said second axis coincident with the extended axis of said first reflector whereby collimated energy received by said second reflector is focused to the focal point of said second reflector, and a third reflector smaller than the second reflector having an internal cavity open at opposite ends and symmetrical about a third axis, one opening of the last-mentioned cavity being smaller than the other opening thereof, the wall of said third reflector diverging in curved lines from the smaller open end thereof to the larger open end and having a focal point on said third axis adjacent to the last-mentioned smaller end, said third reflector being disposed with its focal point coincident with the focal point of said second reflector and said third axis coincident with the second axis extended, whereby said third reflector emits a collimated intense beam smaller than that received by said second reflector, the openings of all of said reflectors being large enough to receive unimpeded the beam bundle of said refractive means.

3. The apparatus of claim 2 wherein said refractive compressing lens has a straight hollow bore which passes through both curved surfaces, said bore having an axis which is aligned with the axes of said reflectors whereby the beam bundle emerging from said lens is hollow.

4. Apparatus for producing a high intensity radiant power beam comprising a first plurality of radiant energy beam sources, first refractive means for receiving a plurality of radiant energy beams and compressing them individually and collectively into a single compressed bundle of beams, said beam sources being directed onto said refractive means to obtain said beam bundle, second refractive means spaced axially from and being optically aligned with said first refractive means, said second refractive means receiving therethrough unimpeded said beam bundle and compressing a plurality of radiant energy beams individually and collectively into a single hollow bundle of beams which intimately surrounds the first-mentioned bundle of beams, and a second plurality of radiant energy beam sources directed onto said second refractive means whereby a second hollow beam bundle is added to the first-mentioned beam bundle.

5. Apparatus for producing a high intensity radiant power beam comprising means for compressing radiant energy from a first plurality of spaced radiant energy sources into a first bundle of beams, and second means for adding a second coaxial hollow bundle of beams to said first bundle.

6. Apparatus for producing a high intensity radiant power beam comprising means for compressing radiant energy from a first plurality of spaced radiant energy sources into a first bundle of beams, second means for adding a second coaxial hollow bundle of beams to said first bundle, and means for compressing the combined first and second bundles into a third bundle of smaller cross-sectional area.

7. Apparatus for producing a high intensity radiant power beam comprising a first refractive compressing lens having two opposed surfaces, one surface being larger than the other and having a predetermined curvature, the smaller surface having a predetermined curvature curved in the same direction as the larger surface, the curvatures of said surfaces being such that beams directed onto said larger surface and toward said smaller surface will be refracted to emerge from the smaller surface in parallelism to provide a single bundle of compacted beams, a plurality of beam sources directed onto said larger surface for obtaining said bundle, a second refractive compressing lens having two opposed surfaces, one surface of said second lens being larger than the other and having a predetermined curvature, the smaller surface of said second lens having a predetermined curvature curved in the same direction as the larger surface, the curvatures of said second lens surfaces being such that beams directed onto said larger surface and toward said smaller surface will be refracted to emerge from the smaller surface in parallelism to provide a second bundle of compacted beams, said second lens having a straight bore which passes through both surfaces thereof, said second lens being mounted opposite said first lens with the larger surface of said second lens being juxtaposed with respect to the smaller surface of said first lens, said bore being aligned with and receiving therethrough the first-mentioned bundle of beams, and a second plurality of beam sources directed onto the larger surface of said second lens to add said second bundle of beams to the exterior of said first bundle of beams.

8. Apparatus for producing a high intensity radiant power beam comprising a first refractive compressing lens having two opposed surfaces, one surface being larger than the other and having a predetermined curvature, curved in the same direction on the larger surface, the curvatures of said surfaces being such that beams directed onto said larger surface and toward said smaller surface will be refracted to emerge from the smaller surface in parallelism to provide a single bundle of compacted beams, a plurality of beam sources directed onto said larger surface for obtaining said bundle, a second refractive compressing lens having two opposed surfaces, one surface of said second lens being larger than the other and having a predetermined curvature, the smaller surface of said second lens having a predetermined curvature curved in the same direction as the larger surface, the curvatures of said second lens surfaces being such that beams directed onto said larger surface and toward said smaller surface will be refracted to emerge from the smaller surface in parallelism to provide a second bundle of compacted beams, said second lens having a straight bore which passes through both surfaces thereof, said second lens being mounted opposite said first lens with the larger surface of said second lens being juxtaposed with respect to the smaller surface of said first lens, said bore being aligned with and receiving therethrough the first-mentioned bundle of beams, and a second plurality of beam sources directed onto the larger surface of said second lens to add said second bundle of beams to the exterior of said first bundle of beams, said second plurality of beam sources being disposed laterally of said first-mentioned bundle.

9. Apparatus for producing a high intensity radiant power beam comprising a first refractive compressing lens having two opposed surfaces, one surface being larger than the other and having a predetermined curvature, the smaller surface having a predetermined curvature curved in the same direction as the larger surface, the larger surface being convex and the smaller surface concave, the curvatures of said surfaces being such that beams directed onto said larger surface and toward said smaller surface will be refracted to emerge from the smaller surface in parallelism to provide a single bundle of compacted beams, a plurality of beam sources circumferentially arranged opposite said larger surface, said sources being directed onto said larger surface for obtaining said bundle, a second refractive compressing lens having two opposite surfaces, one surface of said second lens being larger than the other and having a predetermined curvature, the smaller surface of said second lens having a predetermined curvature curved in the same direction as the larger surface, the curvatures of said second lens surfaces being such that beams directed onto said larger surface and toward said smaller surface will be refracted to emerge from the smaller surface in parallelism to provide a second bundle of compacted beams, said second lens having a straight bore which passes through both surfaces thereof, said second lens being mounted opposite said first lens with the larger surface of said second lens being juxtaposed with respect to the smaller surface of said first lens, said bore being aligned with and receiving therethrough the first-mentioned bundle of beams, and a second plurality of beam sources directed onto the larger surface of said second lens to add said second bundle of beams to the exterior of said first bundle of beams.

10. The apparatus of claim 7 including a support, said first and second lenses being fixedly mounted on said support, said first mentioned plurality of sources being mounted on said support opposite the larger surface of said first lens in a generally circular pattern, said second plurality of beam sources being fixedly mounted on said support in a circumferential pattern laterally outside said first-mentioned bundle.

11. Apparatus for producing a high intensity radiant power beam comprising a collimating reflector having an interior energy-reflective wall defining a cavity which is generally circular in shape and symmetrical about an axis, said cavity having opposite open ends which are concentric with said axis, the opening at one end being smaller than the opening at the other end, said wall diverging in curved lines from said smaller open end to said larger open end and having a focal point on said axis adjacent to said smaller open end, a plurality of beam sources arranged around said smaller end and including means for producing a plurality of focused beams respectively, said beam sources being disposed circumferentially of said smaller end and radially outwardly of said axis, said beam sources being directed inwardly toward and through the smaller open end in a direction transverse to said axis with the focus of said beams respectively coinciding with said focal point, said sources further being positioned to direct said beams onto said cavity wall from which they are reflected, the curvature of said wall being such that said beams are reflected therefrom through said larger open end in a direction parallel to said axis.

12. The apparatus of claim 11 including means projecting a main beam of radiant energy through said cavity axially thereof from the smaller to the larger end, said wall curvature reflecting said plurality of beams in a region immediately surrounding said main beam.

13. Apparatus for producing a high intensity radiant power beam comprising a collimating reflector having an interior energy-reflective wall defining a cavity which is generally circular in shape and symmetrical about an axis, said cavity having opposite open ends which are concentric with said axis, the opening at one end being smaller than the opening at the other end, said wall diverging in curved lines from said smaller open end to said larger open end and having a focal point on said axis adjacent to said smaller open end, a plurality of beam sources arranged around said smaller end and including means for producing a plurality of focused beams respectively, said beam sources being disposed circumferentially of said smaller end and radially outwardly of said axis, said beam sources being directed inwardly toward and through the smaller open end in a direction transverse to said axis with the focus of said beams respectively coinciding with said focal point, said sources further being positioned to direct said beams onto said cavity wall from which they are reflected, the curvature of said wall being such that said beams are reflected therefrom through said larger open end in a direction parallel to said axis, a first refractive compressing lens having two opposed surfaces, one surface being larger than the other and having a predetermined curvature, the smaller surface having a predetermined curvature curved in the same direction as the larger surface, the curvatures of said surfaces being such that beams directed onto said larger surface and toward said smaller surface will be refracted to emerge from the smaller surface in parallelism to provide a single bundle of compacted beams, a plurality of beam sources directed onto said lens for obtaining said bundle, a second refractive compressing lens having two opposed surfaces, one surface of said second lens being larger than the other and having a predetermined curvature, the smaller surface of said second lens having a predetermined curvature, the smaller surface of said second lens having a predetermined curvature curved in the same direction as the larger surface, the curvatures of said second lens surfaces being such that beams directed onto said larger surface and toward said smaller surface will be refracted to emerge from the smaller surface in parallelism to provide a second bundle of compacted beams, said second lens having a straight bore which passes through both surfaces thereof, said second lens being mounted opposite said first lens with the larger surface of said second lens being juxtaposed with respect to the smaller surface of said first lens, said bore being aligned with and receiving therethrough the first-mentioned bundle of beams, and a second plurality of beam sources directed onto the larger surface of said second lens to add said second bundle of beams to the exterior of said first bundle of beams, said reflector being positioned with its axis aligned with said first and second bundles and the latter passing through said cavity from the smaller to the larger end, said wall curvature reflecting the beams directed thereagainst into a region immediately surrounding said second bundle thereby providing an enlarged collimated beam of energy.

14. The method of producing a high intensity radiant power beam comprising the steps of producing a first beam of radiant energy and adding a plurality of second beams extending parallel to said first beam to said first beam thereby producing a composite bundle of energy beams.

15. The method of producing a high intensity radiant power beam comprising the steps of producing a first beam of radiant energy and adding a plurality of second beams extending parallel to said first beam to the exterior of said first beam thereby producing a composite bundle of energy beams, and compressing such composite bundle of beams into a second bundle of smaller cross-sectional area.

16. The method of producing a high intensity radiant power beam comprising the steps of collecting and compressing a plurality of transversely directed beams of energy into a collimated bundle of beams, and collecting a second plurality of transversely directed beams of energy into a hollow collimated bundle of beams which is coaxial with and immediately surrounds the first-mentioned bundle thereby providing a composite bundle of beams.

17. Apparatus for producing a high intensity radiant power beam comprising a first plurality of radiant energy sources, first means for receiving the radiant energy from said sources and compressing it into a single bundle of collimated beams, a second plurality of radiant energy sources, second means spaced from and being optically aligned with said first means, said second means receiving therethrough said beam bundle and compressing the radiant energy from said second sources into a second bundle of collimated beams which is adjacent to and parallel to the first-mentioned bundle, thereby providing a composite bundle of collimated beams.

18. Apparatus for producing high intensity radiant power beam comprising a reflector having an interior energy-reflective wall, said wall coinciding with at least a portion of a geometrical surface defining a cavity which is generally circular in shape and symmetrical about an axis, said cavity having opposite open ends which are concentric with said axis, the opening at one end being smaller than the opening at the other end, said cavity diverging in curved lines from said smaller open end to said larger open end and having a focus on said axis adjacent to said smaller open end, said wall extending from one end of said cavity to the other end and having an area which coincides with at least a portion of the circular extent of said surface, said wall having a focus which coincides with the aforesaid focus, a second reflector having an interior energy-reflective wall, said second wall coinciding with at least a portion of a geometrical surface defining a cavity which is generally circular in shape and symmetrical about the aforesaid axis, said second cavity having opposite open ends which are concentric with said axis, the opening at one end of said second cavity being smaller than the opening at the other end, said second cavity diverging in curved lines from the smaller to the larger end and having a focus adjacent to the smaller end which coincides with the first-mentioned focus, said second wall extending from one end of said second cavity to the other end and having an area which coincides with at least a portion of the circular extent of said second surface, the smaller ends of both aforesaid cavities being juxtaposed and said first and second walls being disposed opposite each other on opposite sides of said axis, whereby radiant energy received and reflected by said first wall is directed through said focus and onto said second wall.

References Cited in the file of this patent

UNITED STATES PATENTS

| Re. 25,105 | Cargill | Dec. 26, 1961 |
| 1,887,650 | Larner et al. | Nov. 15, 1932 |
| 2,342,115 | Blauvelt | Feb. 22, 1944 |
| 2,364,730 | Leskin | Dec. 12, 1944 |
| 2,558,593 | Taylor | June 26, 1951 |
| 2,642,488 | Epstein | June 15, 1953 |
| 2,920,187 | Wendelkin | Mar. 1, 1960 |

UNITED STATES PATENT OFFICE
CERTIFICATE OF CORRECTION

Patent No. 3,107,296                                    October 15, 1963

Sheldon H. Hine

It is hereby certified that error appears in the above numbered patent requiring correction and that the said Letters Patent should read as corrected below.

Column 9, line 41, before "curved" insert -- the smaller surface having a predetermined curvature --.

Signed and sealed this 21st day of April 1964.

(SEAL)
Attest:

ERNEST W. SWIDER

Attesting Officer

EDWARD J. BRENNER

Commissioner of Patents